United States Patent [19]

Sawachika et al.

[11] 4,075,137

[45] Feb. 21, 1978

[54] PROCESS FOR PREPARING FLAME RETARDING POLYURETHANE FOAMS

[75] Inventors: Yasumasa Sawachika, Ashikaga; Hiroshi Kawakami, Tanuma; Shuzo Minegishi, Tokyo, all of Japan

[73] Assignee: Kohkoku Chemical Industry Co., Ltd., Tokyo, Japan

[21] Appl. No.: 682,351

[22] Filed: Apr. 30, 1976

Related U.S. Application Data

[63] Continuation-in-part of Ser. No. 621,673, Oct. 14, 1975, abandoned, which is a continuation of Ser. No. 460,077, April 1, 1974, abandoned.

[30] Foreign Application Priority Data

Apr. 19, 1973  Japan .................................. 48-44468

[51] Int. Cl.$^2$ ........................ C08G 18/14; C08G 18/78
[52] U.S. Cl. .............................................. 260/2.5 AT
[58] Field of Search ................................. 260/2.5 AT

[56] References Cited

U.S. PATENT DOCUMENTS

| | | | |
|---|---|---|---|
| 3,367,956 | 2/1968 | Hennig | 260/2.5 AT |
| 3,943,158 | 3/1976 | Dietrich | 260/2.5 AT |
| 3,970,618 | 7/1976 | Jabs | 260/2.5 AT |

FOREIGN PATENT DOCUMENTS

| | | | |
|---|---|---|---|
| 1,963,189 | 6/1971 | Germany | 260/2.5 AT |

*Primary Examiner*—C. Warren Ivy
*Attorney, Agent, or Firm*—Toren, McGeady and Stanger

[57] ABSTRACT

Process for preparing flame retarding polyurethane foams from a polyhydroxyl compound, diisocyanate mixture, a blowing agent, a catalyst and any other auxiliary agent if necessary, comprising mixing polyhydroxyl compound having at least two active hydrogen atoms per molecule, a molecular weight of 1,000 to 10,000 and wherein at least 10% by weight of the hydroxyl groups are primary hydroxyl groups, and a diisocyanate mixture containing 10 to 60% by weight of a modified diisocyanate prepared from the reaction of a diisocyanate compound expressed by the formula

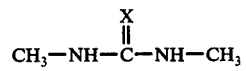

wherein X is an oxygen or sulfur atom.

8 Claims, 1 Drawing Figure

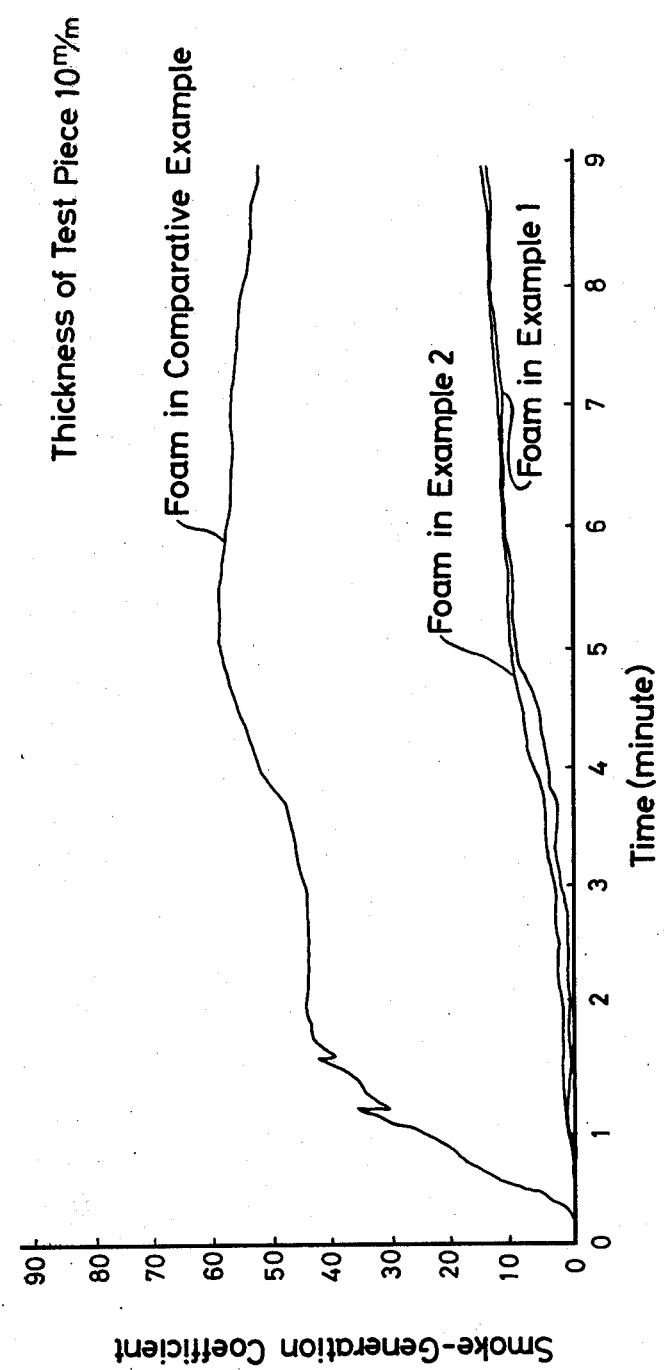

PROCESS FOR PREPARING FLAME RETARDING POLYURETHANE FOAMS

CROSS REFERENCE TO RELATED APPLICATIONS

This is a Continuation-in-Part of copending application Ser. No. 621,673, filed Oct. 14, 1975, which, in turn, is a Continuation of application Ser. No. 460,077, filed Apr. 11, 1974; both now abandoned.

BACKGROUND OF THE INVENTION

1. Field of the Invention

The present invention relates to a process for preparing flexible polyurethane foams which possess flame retarding properties.

2. Description of the prior Art

Thus far, polyurethane foams have been utilized as materials for routine use, such as, domestic funiture and cushions for vehicles due to their excellent cushioning properties. However, their use was restricted because of their lack of flame retarding properties. To avoid this handicap, investigations were made to provide polyurethane foams with flame retarding properties. This can be done by adding a large amount of flame retardant compounds, such as, compounds of phosphorus and halogens, either alone, or in combination to such foams. However, the foams thus treated evolve a large amount of smoke on combustion. The evolved smoke may cause serious disasters during fires. Thus, there is a general trend to regulate the smoke generation of vehicle and construction materials on combustion.

The present inventors, through extensive investigations on this point, have succeeded in producing flame retarding polyurethane foams which generate little smoke on combustion.

SUMMARY OF THE INVENTION

This invention relates to a process for preparing flame retarding polyurethane foams from a polyhydroxyl compound, diisocyanate mixture, a blowing agent, a catalyst and other auxiliary agents, if necessary, comprising reacting a polyhydroxyl compound having at least two active hydrogen atoms per molecule, a molecular weight of 1,000 to 10,000 and having at least 10% by weight of hydroxyl groups which are primary hydroxyl, and a diisocyanate mixture containing 10 to 60% by weight of a modified diisocyanate prepared from an organic diisocyanate and a compound (I) expressed by the general formula

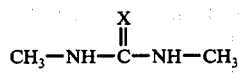  (I)

where X is an oxygen or sulfur atom.

The reaction to prepare the modified diisocyanate is carried out by reacting each mole of compound I with about 3.6 to 25.6 moles of a diisocyanate at a temperature below 150° C such that only a divalent polyisocyanate is obtained.

BRIEF DESCRIPTION OF THE DRAWING

The FIGURE is a comparative graph of the variation of smoke generation properties of known materials and the present invention with burning time.

DESCRIPTION OF THE PREFERRED EMBODIMENT

The polyhydroxyl compounds available in this invention can be prepared by adding butylene, propylene or ethylene oxide to a reaction initiator having at least two hydroxyl groups, such as, glycol, glycerine, and trimethylolpropane, to make the molecular weight up to 1,000 to 10,000, and at least 10% by weight of the hydroxyl groups, primary hydroxyl groups.

Difunctional polyols containing primary hydroxyl groups include poly(oxypropylene)-poly(oxyethylene)glycol, and poly(oxybutylene)-poly(oxyethylene)glycol. Trifunctional polyols include poly(oxypropylene)-poly(oxyethylene)triol and poly(oxybutylene)-poly(oxyethylene)triol. Polyols containing other than primary hydroxyl groups may be used in combination with the above mentioned polyols only if the primary hydroxyl groups amount to at least 10% by weight of the total hydroxyl groups.

Organic diisocyanates suitable for use in the process of this invention include aliphatic diisocyanates (such as hexamethylenediisocyanate), cycloaliphatic diisocyanates (such as dicyclohexylmethane diisocyanates) and aromatic diisocyanates (such as tolylenediisocyanate, diphenylmethanediisocyanate and xylylenediisocyanate).

The compound suitable to use in this invention to prepare the modified diisocyanate is expressed by a general formula

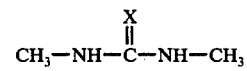

where X is an oxygen or sulfur atom, and include 1,3-dimethyl urea, 1,3-diphenylurea and 1,3-diethylthiourea. The modified diisocyanate prepared from the organic diisocyanate and the compound expressed by the general formula above amounts to 10 to 60%, and preferably from 20 to 50%, by weight of the total diisocyanate. If the amount of the modified diisocyanate, which is the larger of the two molecules exceeds 60% by weight, the diisocyanate mixture solution will lose some of the reactivity and the polyurethane foams will be of poorer quality. On the other hand, if the modified diisocyanate content is below 10% by weight, the products will lose the self-extinguishing property as defined by flammability test ASTM D 1692-68. The free diisocyanates may be either the same or different from the isocyanates that have reacted with the above-mentioned compounds.

In the process of this invention, a blowing agent and a catalyst are also used in accordance with the conventional process for production of polyurethane foams. As for blowing agents, water is the most commonly used material and halogenated alkanes and other low boiling solvents are also available. These materials may be used either alone or combined. The latter compounds include, for example, methylene chloride, trichloromonofluoromethane, dichlorodifluoromethane and acetone. Catalysts that can be used in this invention include tertiary amines (such as triethylamine, dimethylbenzylamine, triethylenediamine and N-alkylmorphorine) and organo tin compounds (such as dibutyl tin dilaurate. Auxiliary agents which may be added are additives, such as, surfactants, pigments, dyestuffs, and fillers.

The amount of polyisocyanate should be approximately equal in chemical equivalent to the total amount of the active hydrogen atoms, and when water is used as the blowing agent, an appropriate amount of polyisocyanate should be increased according to the water content.

The raw materials mentioned above are treated by the conventional process techniques to make the polyurethane foams in the present invention.

For instance, the raw materials containing isocyanates are mixed with an equivalent amount of materials not containing isocyanate by either a mechanical or manual procedure, and the resulting mixture is agitated either continuously or discontinuously with a stirrer, to obtain a polyurethane foam. To produce continuously a large amount of polyurethane foams, a foaming machine can efficiently be used.

In carrying out the reaction between compound (I) and the diisocyanate, it is important that the molar ratio of 1 : 3.6 to 25.6 be maintained and that the reaction temperature be less than 150° C. Otherwise, trivalent and tetravalent isocyanates are produced which are not suitable for the present invention.

For example, using toluenediisocyanate and compound (I) in the form of an urea, i.e., X = oxygen, the reaction sequence is:

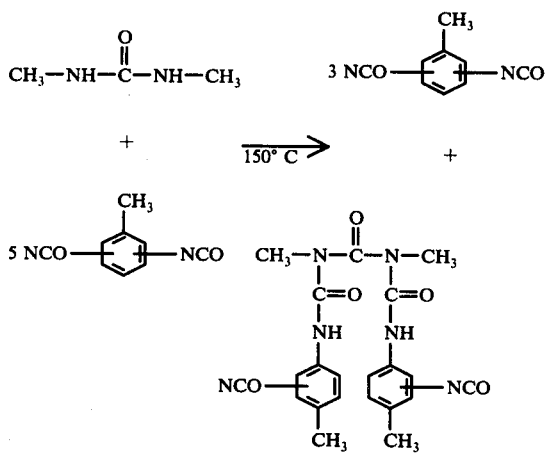

In contrast, at temperatures above 150° C, the reaction sequence would be:

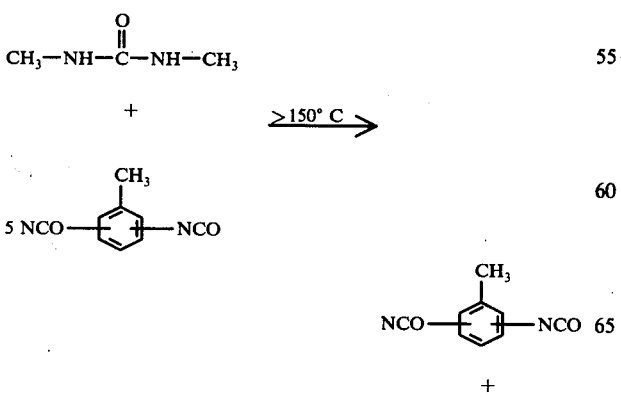

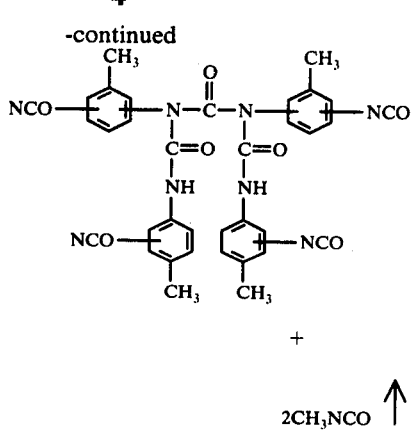

The monoisocyanate produced is removed, in the latter case.

With such trivalent and tetravalent isocyanates, the excellent smoke retarding properties of the present invention are not obtained. Moreover, foams produced from such materials would not be as flexible as those in accordance with the present invention.

By applying the process of the present invention, flame retarding polyurethane foams having low smoke generation properties that have been otherwise impossible to produce, can successfully be prepared. These polyurethane foams exhibit self-extinguishing properties as defined by the flammability test ASTM D 1692-68 and a small smoke generation coefficient as defined in JIS A 1321.

The figure shows a comparison of the smoke generation coefficient as determined by JIS A 1321 of foams produced by the process of this invention appearing in Examples 1 and 2 and in the comparison example.

For the sake of comparison, the previous processes for preparing the flame retarding polyurethane foams will be described as follows:

| COMPARISON EXAMPLE | |
|---|---|
| Polyol (glycerine base, OH value 55 and molecular weight being 3,000) | 100 parts by weight |
| Water | 3.5 |
| Stannous octoate | 0.6 |
| Triethylenediamine | 0.1 |
| N-methylmorpholine | 1.0 |
| Silicone surfactant | 1.5 |
| Tris(2-chloroethyl)phosphate | 13 |
| Tolylenediisocyanate | 45 |

A composition consisting of the above components was vigorously stirred for about 7 seconds with an agitator and allowed to rise freely to a foam to obtain a mass of polyurethane foam. The characteristics of this foam were as follows:
Foam density: 2.1 lb/ft$^3$
Tensile strength: 15.6 lb/in$^2$
Tear strength: 3.4 lb/in
25% ILD: 22 lb/50in$^2$
Elongation: 180%

These foam properties were measured by ASTM D 1564-71. The foam was self-extinguishing in the flammability test as defined by ASTM D 1692-68. Further, the smoke-generation coefficient as estimated by JIS A 1321 was 60.

Examples of the present invention are as follows:

EXAMPLE 1

1. Preparation of diisocyanate mixture.

176 g of 1,3-dimethylurea was gradually added to 1740 g of a 80/20 isomeric mixture of 2,4- and 2,6-tolylenediisocyanates at 110° C, then the temperature was elevated up to 150° C under a protecting atmosphere of nitrogen, and the reaction was continued for 12 hours with the temperature maintained, to obtain a diisocyanate mixture which contains 45.1% by weight of modified diisocyanate. When cooled, the mixture showed the following properties:
NCO content: 35.1%
Viscosity: 148 cps/25° C

| 2) Preparation of polyurethane foam | |
|---|---|
| Polyol (glycerine base, OH value 25, and molecular weight 6000, primary hydroxyl group content 60%) | 100 parts |
| Water | 3.5 |
| Triethylenediamine | 0.1 |
| Triethylamine | 0.6 |
| Silicone surfactant | 0.5 |
| Diisocyanate mixture | 50 |

A mixture consisting of the above components was vigorously stirred with an agitator for 7 seconds and allowed to rise freely to a foam to obtain a polyurethane foam. This foam had the following characteristics:

| Foam density: | 2.1 lb/ft$^3$ |
|---|---|
| Tensile strength: | 18.2 lb/in$^2$ |
| Tear strength: | 3.5 lb/in |
| 25% ILD: | 17.6 lb/50 in$^2$ |
| Elongation: | 150% |

The foam was self-extinguishing as defined by ASTM D 1692-68. Data in this example and the comparison example are shown in Table 1. Further, the smoke generation coefficient as estimated by JIS A 1321 was 14, which was much smaller than those exhibited by the foams prepared by previous processes.

EXAMPLE 2

1. Preparation of diisocyanate mixture.
135 g of 1,3-dimethylthiorea was gradually added to 1810 g of a 80/20 isomeric mixture of 2,4- and 2,6-tolylenediisocyanates, and the temperature was elevated up to 150° C under a protecting atmosphere of nitrogen, the whole mixture was kept stirred at the same temperature for 12 hours, to obtain a diisocyanate mixture which contains 30.2% by weight of modified diisocyanate. When cooled, the product mixture showed the following characteristics:

| NCO content | 40.0% |
|---|---|

| -continued | |
|---|---|
| Viscosity | 69 cps/25° C |

| 2) Preparation of polyurethane foams. | |
|---|---|
| Polyol (glycerine base, OH value 25, molecular weight 6,000 primary OH group content 60%) | 100 parts |
| Water | 3.5 |
| Triethylenediamine | 0.1 |
| Triethylamine | 0.6 |
| Silicone surfactant | 0.5 |
| Diisocyanate mixture | 43.0 |

A composition consisting of the above components was vigorously agitated for 7 seconds with a stirrer, and then allowed to rise freely to a foam to obtain a mass of polyurethane foam. The characteristics exhibited by the foam were as follows:

| Foam density: | 1.9 lb/ft$^3$ |
|---|---|
| Tensile strength: | 13.9 lb/in$^2$ |
| Tear strength: | 2.9 lb/in |
| 25% ILD: | 15.4 lb/50 in$^2$ |
| Elongation: | 130% |

The foam was also self-extinguished as defined in ASTM D 1692-68. Comparison with the Comparison Example above is shown in Table 1. The smoke generation coefficient was estimated to be 15 following JIS A 1321. This is illustrated in FIG. 1 in comparison. Comparison Example above.

TABLE 1

| | Flammability by ASTM D 1692-68 | | |
|---|---|---|---|
| | Foam in Example 1 | Foam in Example 2 | Foam in Comparative Example |
| Burning extent (mm) | 50 | 60 | 70 |
| Extinguishment time (sec.) | 26 | 35 | 50 |
| Burning rate (mm/min.) | 115 | 103 | 84 |
| Flammability | self-extinguishment | self-extinguishment | self-extinguishment |
| Remark | | | |
| Foam density: | 2.1 lb/ft$^3$ | 1.9 lb/ft$^3$ | 2.1 lb/ft$^3$ Prepared in the presence of flame retardant containing halogen and phosphorus. |

What is claimed is:
1. A process for preparing flexible and flame retarding polyurethane foams, comprising adding
A. a diisocyanate mixture which contains about 10 to 60% by weight of a divalent biuret diisocyanate obtained by reacting one mole of a compound having the formula of

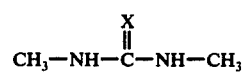

wherein X is oxygen or sulfur with about 3.6 to 25.6 moles of an organic diisocyanate at a temperature below 150° C to
B. a mixture of polyhydroxyl compound having at least two active hydrogen atoms and a molecular weight between about 1000 and 10,000, at least 10% by weight of the total hydroxyl group being primary hydroxyl, a blowing agent, and a catalyst.

2. The process according to claim 1, wherein the organic diisocyanate is an aliphatic diisocyanate.

3. The process according to claim 1, wherein the organic diisocyanate is a cycloaliphatic diisocyanate.

4. The process according to claim 1, wherein the organic diisocyanate is an aromatic diisocyanate.

5. The process according to claim 1, wherein the diisocyanate is a mixture of more than two aliphatic diisocyanates.

6. The process according to claim 1, wherein the diisocyanate is a mixture of more than two cycloaliphatic diisocyanates.

7. The process according to claim 1, wherein the diisocyanate is a mixture of more than two aromatic diisocyanates.

8. A flame retarding polyurethane foam prepared by the process of claim 1.

* * * * *